(12) United States Patent
Muchherla et al.

(10) Patent No.: US 10,915,444 B2
(45) Date of Patent: Feb. 9, 2021

(54) GARBAGE COLLECTION CANDIDATE SELECTION USING BLOCK OVERWRITE RATE

(71) Applicant: Micron Technology, Inc., Boise, ID (US)

(72) Inventors: Kishore Kumar Muchherla, Fremont, CA (US); Sampath K. Ratnam, Boise, ID (US); Ashutosh Malshe, Fremont, CA (US); Peter Sean Feeley, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 72 days.

(21) Appl. No.: 16/234,271

(22) Filed: Dec. 27, 2018

(65) Prior Publication Data
US 2020/0210330 A1 Jul. 2, 2020

(51) Int. Cl.
*G06F 12/00* (2006.01)
*G06F 13/00* (2006.01)
*G06F 12/02* (2006.01)

(52) U.S. Cl.
CPC .. *G06F 12/0253* (2013.01); *G06F 2212/1044* (2013.01)

(58) Field of Classification Search
CPC .............. G06F 12/0253; G06F 2212/1044
USPC ......................................... 711/154
See application file for complete search history.

(56) References Cited

U.S. PATENT DOCUMENTS

| 5,432,919 | A  | * | 7/1995 | Falcone | G06F 12/123 711/134 |
|---|---|---|---|---|---|
| 10,055,168 | B2 | * | 8/2018 | Lee | G06F 13/16 |
| 2012/0054414 | A1 | * | 3/2012 | Tsai | G06F 12/0246 711/103 |
| 2012/0079167 | A1 | * | 3/2012 | Yao | G06F 3/0679 711/103 |
| 2012/0102297 | A1 | * | 4/2012 | Haines | G06F 12/0246 711/209 |
| 2013/0097210 | A1 | * | 4/2013 | Amit | G06F 12/0253 707/813 |
| 2014/0032817 | A1 | * | 1/2014 | Bux | G06F 12/0246 711/103 |

(Continued)

*Primary Examiner* — Sheng Jen Tsai
(74) *Attorney, Agent, or Firm* — Lowenstein Sandler LLP

(57) ABSTRACT

A processing device in a memory system determines whether a first data block of a plurality of data blocks on the memory component satisfies a first threshold criterion pertaining to a first number of the plurality of data blocks having a lower amount of valid data than a remainder of the plurality of data blocks. Responsive to the first data block satisfying the first threshold criterion, the processing device determines whether the first data block satisfies a second threshold criterion pertaining to a second number of the plurality of data blocks having been written to more recently than the remainder of the plurality of data blocks. Responsive to the first data block satisfying the second threshold criterion, the processing device determines whether a rate of change of an amount of valid data on the first data block satisfies a third threshold criterion. Responsive to the rate of change satisfying the third threshold criterion, the processing device identifies the first data block as a candidate for garbage collection on the memory component.

20 Claims, 5 Drawing Sheets

(56) References Cited

U.S. PATENT DOCUMENTS

| | | | |
|---|---|---|---|
| 2015/0169442 A1* | 6/2015 | Fisher | G06F 12/0253 |
| | | | 711/103 |
| 2016/0283369 A1* | 9/2016 | Hada | G06F 12/0253 |
| 2017/0083436 A1* | 3/2017 | Jung | G06F 12/0246 |
| 2017/0168929 A1* | 6/2017 | Kanno | G06F 3/0616 |
| 2017/0242786 A1* | 8/2017 | Shin | G06F 3/061 |
| 2018/0088805 A1* | 3/2018 | Kanno | G06F 3/065 |
| 2018/0088811 A1* | 3/2018 | Kanno | G06F 3/0659 |
| 2018/0108419 A1* | 4/2018 | Lin | G11O 8/08 |
| 2018/0129452 A1* | 5/2018 | Li | G06F 11/1068 |
| 2018/0276118 A1* | 9/2018 | Yanagida | G06F 3/064 |
| 2019/0079861 A1* | 3/2019 | Amaki | G11O 29/42 |
| 2019/0205249 A1* | 7/2019 | Byun | G06F 3/0608 |
| 2019/0227926 A1* | 7/2019 | Ke | G06F 3/0604 |
| 2019/0266082 A1* | 8/2019 | Na | G06F 3/064 |
| 2019/0391760 A1* | 12/2019 | Miura | G06F 3/0604 |

* cited by examiner

GARBAGE COLLECTION CANDIDATE SELECTION USING BLOCK OVERWRITE RATE

TECHNICAL FIELD

Embodiments of the disclosure relate generally to memory sub-systems, and more specifically, relate to garbage collection candidate selection using block overwrite rate.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
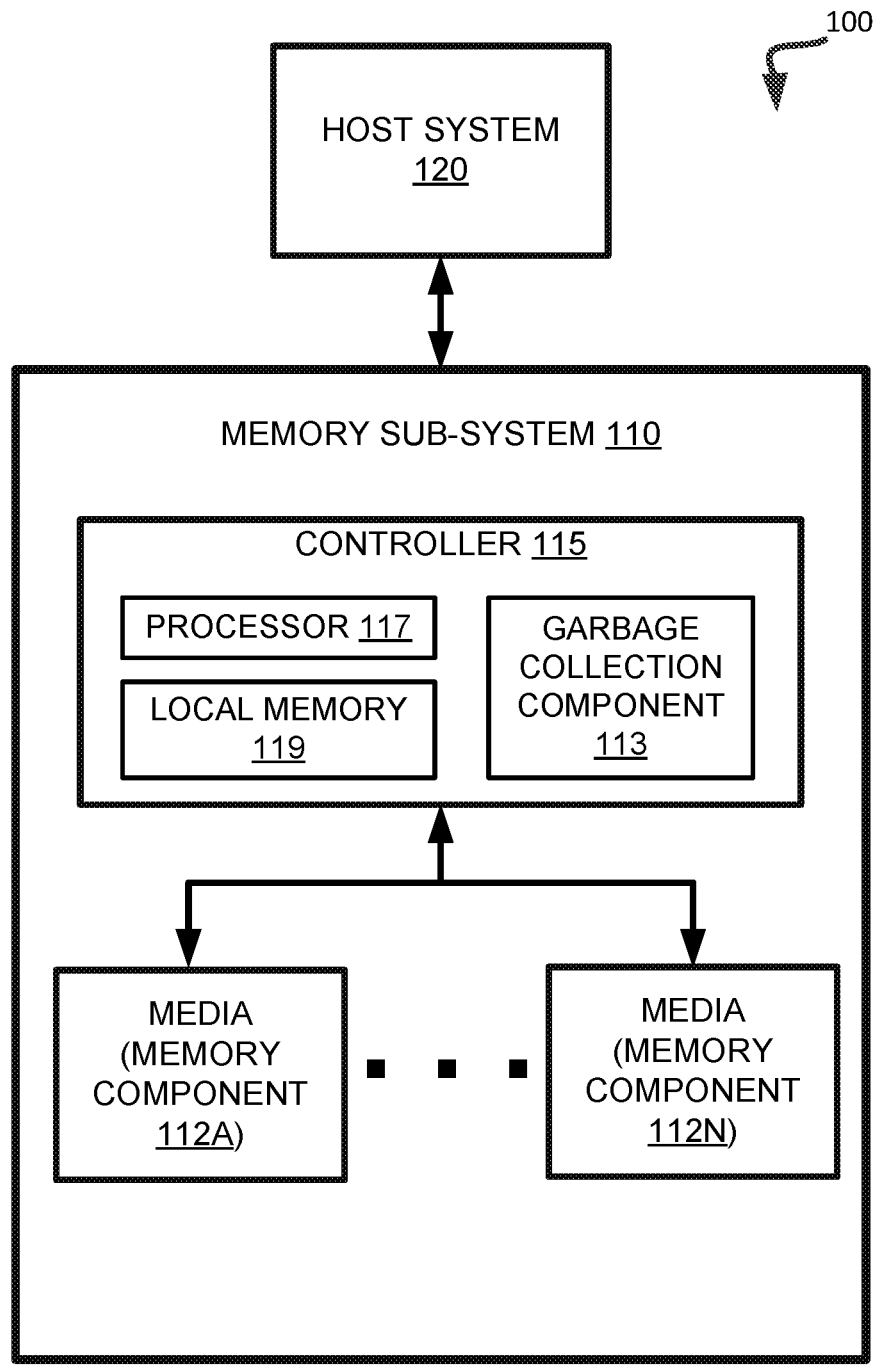
FIG. 1 illustrates an example computing environment that includes a memory sub-system in accordance with some embodiments of the present disclosure.

Aspects of the present disclosure are directed to tracking block overwrite rate for garbage collection candidate selection in a memory sub-system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

A memory component in a memory sub-system can include memory cells that can include one or more memory pages (also referred to herein as "pages") for storing one or more bits of binary data corresponding to data received from the host system. One or more memory pages of the memory component can be grouped together to form a data block. When data is written to the memory component, it is typically done at the page level, such that an entire page, or multiple pages, is written in a single operation. When the memory component is full, such that there is insufficient capacity to accept additional write operations, certain data can be erased in order to free up space. When data is erased from the memory component, however, it is typically done at the block level, such that an entire block (including multiple pages) is erased in a single operation. Thus, when a particular segment of data on the memory component is updated, for example, certain pages in a block will have data that has been re-written to a different page and/or is no longer needed. The entire block cannot simply be erased as each block likely also has some number of pages of valid data. A garbage collection process can be performed which involves moving those pages of the block that contain valid data to another block, so that the current block can be erased and rewritten. Garbage collection is a form of automatic memory management that attempts to reclaim garbage, or memory occupied by stale data objects that are no longer in use (e.g., because they have been updated with new values). The basic principle of garbage collection is to find data objects that cannot or need not be accessed in the future, and to reclaim the resources (i.e. storage space) used by those objects. The additional writes that result from moving data from one block to another during the garbage collection process create a phenomenon referred to as write amplification. This is generally undesirable as the individual segments, data units, or blocks of the memory component can be written, read, and/or erased only a finite number of times before physical wear causes the memory component to fail.

A conventional memory sub-system identifies candidate blocks for garbage collection based on the amount of valid data stored in each block. The memory sub-system may maintain a record of how much valid data is stored in each block by incrementing or decrementing the record each time a write or erase operation is performed. Conventional garbage collection solutions typically simply identify and erase the blocks on the memory component that have the least amount of valid data at the time garbage collection is performed. Other conventional solutions may usually exempt the most recently written blocks from garbage collection, but still identify and erase those blocks with the least amount of valid data. Both of these techniques have certain inefficiencies, however. Blocks with already low amounts of valid data may continue to be updated in the future, resulting in even lower amounts of valid data that would need to be rewritten if garbage collection was postponed for those blocks. Thus, garbage collecting those blocks before the additional data is invalidated may result in unnecessary write amplification (i.e., unnecessary wear on the memory component). Furthermore, by exempting the most recently written blocks from garbage collection (i.e., those blocks that are likely to have lower levels of valid data since they are frequently being updated), the conventional memory sub-system is likely garbage collecting blocks with higher levels of valid data, resulting in additional write amplification.

Aspects of the present disclosure address the above and other deficiencies by having a memory sub-system that identifies blocks as candidates for garbage collection using an overwrite rate for the blocks. In one embodiment, the memory sub-system tracks a rate of change in the amount of valid data on recently written blocks of the memory component to identify blocks for which the rate of data invalidation is growing (i.e., blocks for which the amount of valid data is continuing to decrease over time). In one embodiment, the percentage of valid (or invalid) data in each block is logged periodically (e.g., after a period of time has passed or after a certain amount of data has been written to the memory component by the host). From these logs, the memory sub-system identifies a certain number of blocks on the memory component that have the least amount of valid data and, in one embodiment, determines whether those blocks were among the most recently written blocks. Blocks that were recently written to are likely to be written to again in the future. These future writes include a chance that more pages in the block will be invalidated. Thus, if garbage collection for those blocks that have been recently written is delayed, there is a higher chance that more of that data will become invalidated over time resulting is lesser write amplification.

In one embodiment, the memory sub-system computes a slope (i.e., the rate of change of valid data over time) for each of those blocks that are among the lowest amount of valid data and the most recently written for use in selecting candidates for garbage collection. If the level of valid data on one of these blocks is trending downward, the memory sub-system can consider waiting to do garbage collection until later (i.e., the memory sub-system will not add that block to a list of garbage collection candidates). If the slope has leveled off and has been consistent for a period of time (i.e., is saturated), then the corresponding block can be a good current candidate for garbage collection since further benefits are unlikely to be realized. As a result, the memory sub-system might end up picking a block with higher amount of valid data now instead of one with lower valid data because that second block will likely have even less valid data in the future, leading to lower utilization of resources, including fewer program/erase (P/E) cycles and improved endurance for the memory component.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data. The data blocks can be further grouped into one or more planes on each of memory components 112A to 112N, where operations can be performed on each of the planes concurrently. Corresponding data blocks from different planes can be associated with one another in a stripe than spans across multiple planes.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a garbage collection component 113 that can be used to select data blocks of memory components 112A to 112N as candidates for garbage collection using an overwrite rate for the blocks. In one embodiment, the garbage collection process is initiated periodically as part of regular memory management operations for the memory sub-system 110. In another embodiment, the garbage collection process is initiated in response to receiving a write request (e.g., from host system 120) and a determination that memory components 112A to 112 N have insufficient capacity to accept the write request. In one embodiment, garbage collection component 113 determines whether a first data block of a plurality of data blocks on one of memory components 112A to 112N is among a first threshold number of the plurality of data blocks having a lower amount of valid data than a remainder of the plurality of data blocks. Responsive to the first data block being among the first threshold number, garbage collection component 113 determines whether the first data block is among a second threshold number of the plurality of data blocks having been written to more recently than the remainder of the plurality of data blocks. Responsive to the first data block being among the second threshold number, garbage collection component 113 determines whether a rate of change of an amount of valid data on the first data block is below a third threshold. Responsive to the rate of change being below the third threshold, garbage collection component 113 identifies the first data block as a candidate for garbage collection on the memory component. Further details with regards to the operations of garbage collection component 113 are described below.

Figure 2:
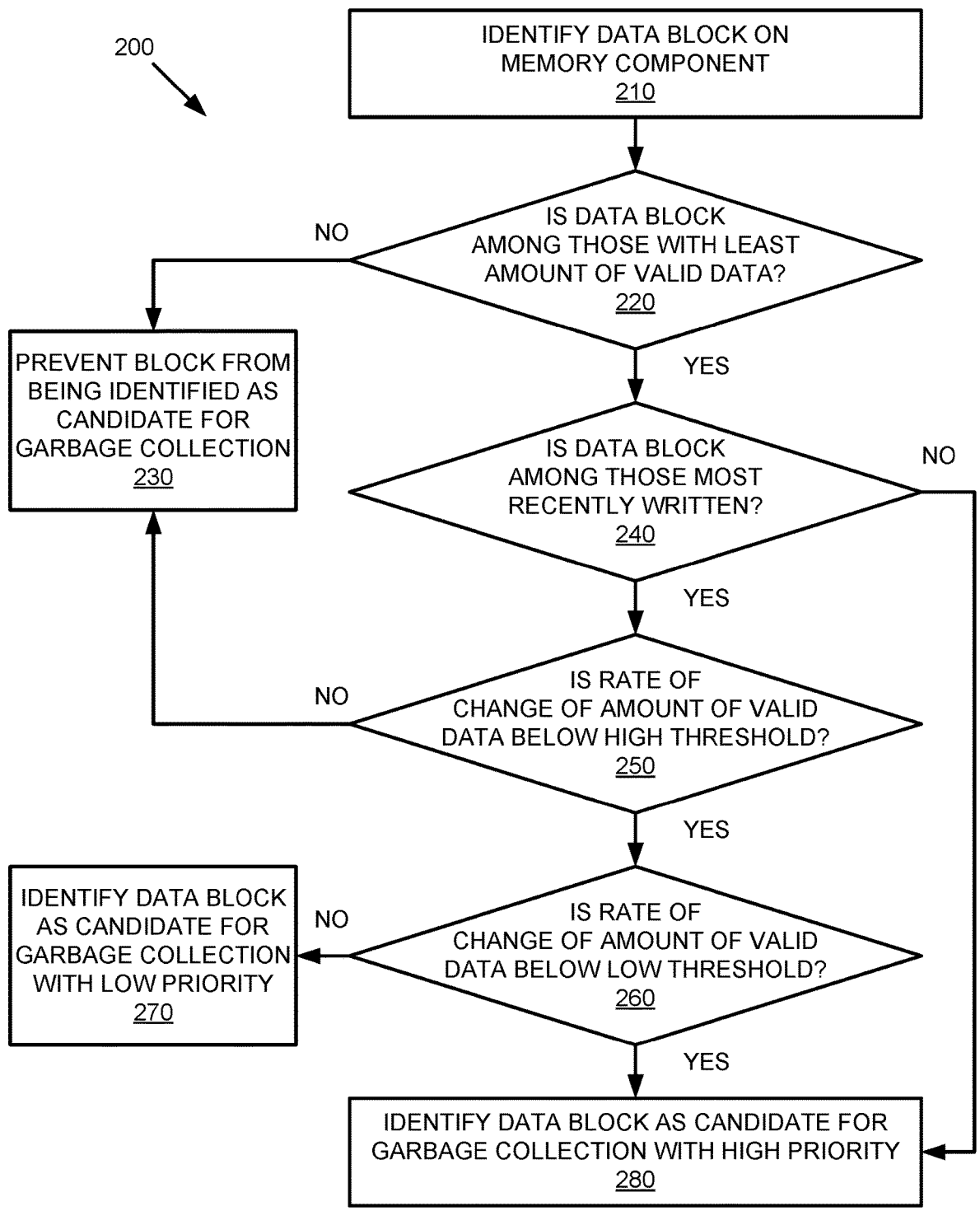
FIG. 2 is a flow diagram of an example method to select blocks as candidates for garbage collection using an overwrite rate for the blocks in accordance with some embodiments of the present disclosure.

FIG. 2 is a flow diagram of an example method to select blocks as candidates for garbage collection using an overwrite rate for the blocks in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the garbage collection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device identifies a first data block on a memory component 112A. The data block may include a grouping of one or more memory pages of the memory component 112A. In one embodiment, the data block may be the smallest unit of the memory component 112A that can that be erased in a single operation and may be one of a plurality of data blocks on memory component 112A. In one embodiment, garbage collection component 113A performs the operations 210-280 for each of the plurality of data blocks on memory component 112A. For ease of understanding, however, an embodiment is described herein using the first data block as an example, which may be any one of the plurality of data blocks on memory component 112A. In one embodiment, garbage collection component 113 identifies some other data unit (e.g., a memory cell, a memory page, a super block, a plane, etc.) of memory component 112A.

At operation 220, the processing device determines whether the first data block is among those data blocks on memory component 112A having the least amount of valid data. In one embodiment, garbage collection component 113 identifies an amount of valid data on each of the plurality of data blocks and sorts the plurality of data blocks based on the amount of valid data on each of the plurality of data blocks. In one embodiment, controller 115 maintains a record in local memory 119 of how much valid data is stored in each block of memory component 112A by incrementing or decrementing the record each time a write or erase operation is performed. Garbage collection component 113 can read these records for the data blocks and create a ranked list in local memory 119 of the data blocks on memory component 112A from those having the most amount of valid data to those having the least amount of valid data. The valid data may include data objects that are up to date and/or still in use by host system 120. Conversely, the invalid data may include stale data objects that are no longer in use (e.g., because they have been updated with new values). In one embodiment, garbage collection component 113 determines whether the first data block satisfies a first threshold criterion pertaining to a first threshold number of the plurality of data blocks having a lower amount of valid data than a remainder of the plurality of data blocks. For example, the first number may include a number (e.g., 6, 8, 10, 15, 20, etc.) of data blocks from the ranked list having the lowest amount of valid data. In one embodiment, garbage collection component 113 determines whether the first data block is among the first number of the plurality of data blocks. Although the embodiments described herein reference the amount of valid data in a data block, in other embodiments, garbage collection component 113 can determine the amount of invalid data and make decisions using that value instead.

If the first data block is not among the first threshold number, at operation 230, the processing device prevents the first data block from being identified as a candidate for garbage selection on the memory component. If garbage collection component 113 determines that the first data block has too large of an amount of valid data, that data block is not a good candidate for garbage collection because too much valid data must be moved to another data block before the first data block can be erased, resulting in unnecessary wear on the memory component 112A.

If, however, the first data block is among the first threshold number, at operation 240, the processing device determines whether the first data bock is among those data blocks on memory component 112A that have been most recently written. In one embodiment, garbage collection component 113 determines when a write operation was performed on each of the plurality of data blocks and sorts the plurality of data blocks based on the time that each respective write operation was performed. Garbage collection component 113 determines whether the first data block satisfies a second threshold condition pertaining to a second number of the plurality of data blocks having been written to more recently than the remainder of the plurality of data blocks. For example, the second threshold number may include a number (e.g., 6, 8, 10, 15, 20, etc.) of data blocks having been written most recently. In one embodiment, garage collection component 113 identifies the second number of data blocks from all of the plurality of data blocks on memory component 112A and determines whether the first data block is among the second number of data blocks. In another embodiment, garage collection component 113 identifies the second threshold number of data blocks from just the data blocks that are also among those having the least amount of data identified at operation 220. If the first data block is not among the second threshold number, at operation 280, the processing device identifies the first data block as a candidate for garbage collection on the memory component 112A, as will be described in more detail below.

Figure 3A:
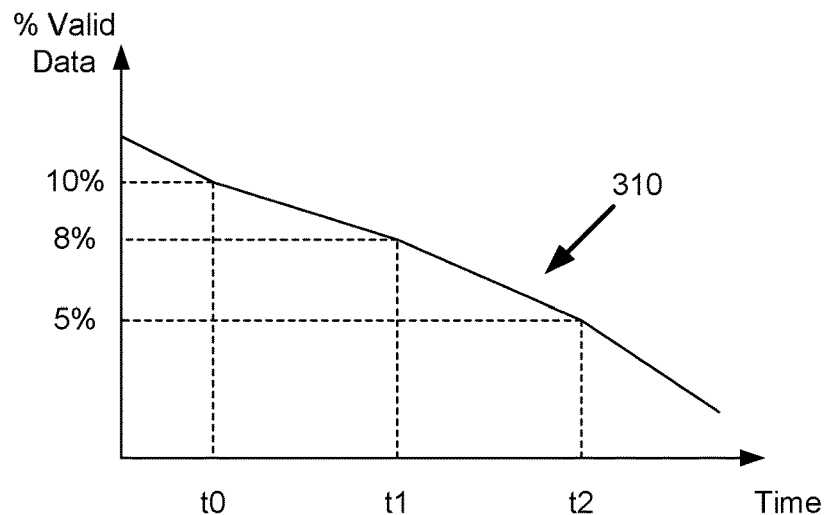
FIGS. 3A-3C are graphs illustrating various overwrite rates for a data block of a memory component in accordance with some embodiments of the present disclosure.

If, however, the first data block is among the second threshold number, at operation 250, the processing device determines whether a rate of change of an amount of valid data on the first data block satisfies a third threshold criterion (i.e., is below a high threshold). The rate of change of the amount of valid data on the first data block represents a level by which the amount of valid data on the first data block has decreased over a period of time. As illustrated in FIG. 3A, in one embodiment, garbage collection component 113 determines the amount of valid data on the first data block at a number of different points in time (e.g., t0, t1, t2). The amount of valid data can be measured as either a raw number or as a fraction or percentage of the total data on the data block (i.e., the amount of valid data plus the amount of invalid data). From these values over time, garbage collection component 113 can determine the rate of change. In one embodiment, garbage collection component 113 can calculate a slope representing the rate of change and/or can predict, based on the past values, a rate of change for the amount of valid data on the first data block in the future. For example, garbage collection component 113 can apply a curve fitting algorithm (e.g., interpolation, smoothing, regression analysis, extrapolation, algebraic, geometric, etc.) to calculate the slope and/or machine learning (e.g., instance-based, regression analysis, regularization, classifiers, etc.) to make the predictions. In one embodiment, the high threshold may be a slope of 5%, for example, although the threshold is configurable, in other embodiments, based on an amount available storage space on the memory component 112A. For example, if a large amount of storage space is available, garbage collection component 113 can afford to be more selective in identifying candidate blocks for garbage collection and thus, can reduce the high threshold. If, however, a lesser amount of storage space is available on memory component 112A, the garbage collection component 113 can be less selective and increase the high threshold.

If the rate of change is above the high threshold, at operation 230, the processing device prevents the first data block from being identified as a candidate for garbage selection on the memory component. If the amount of valid data on the first data block is trending downward (i.e., the rate of decrease in the amount of valid data is constant or at least has not leveled off) as illustrated by line 310 in FIG. 3A, garbage collection component 113 can wait to garbage collect the first block until later. Given the trend, the first data block will likely have even less valid data in the future, leading to lower utilization of resources, including fewer program/erase (P/E) cycles and improved endurance for the memory component 112A.

If the rate of change is below the high threshold, at operation 260, the processing device determines whether the rate of change satisfies a fourth threshold criterion (i.e., is below a low threshold). In one embodiment, the low threshold may be a slope of 1% or 0.1%, for example, although, as described above, the threshold is configurable. The low threshold represents a saturation point at which it is expected that the amount of valid data on the data block will not decrease any further. If the calculated slope has leveled off and has been consistent for a period of time (i.e., is saturated), then the first data block can be a good current candidate for garbage collection since further benefits are unlikely to be realized.

Figure 3B:
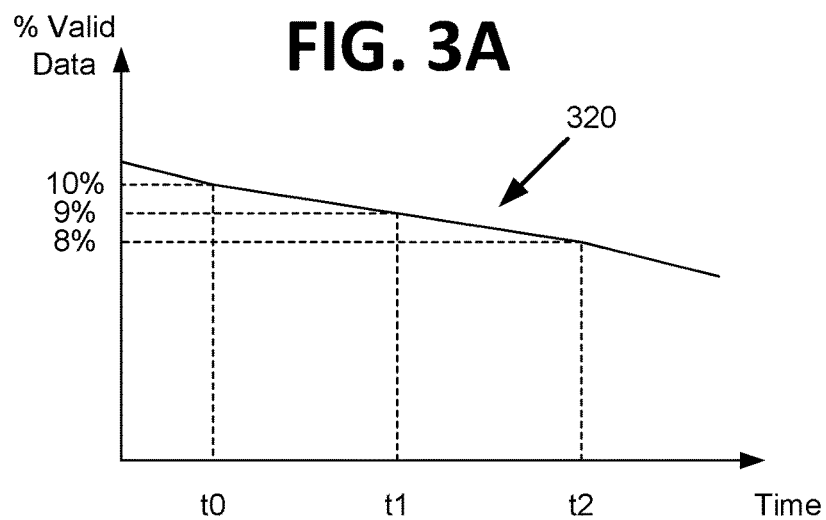

If the rate of change is above the low threshold, at operation 270, the processing device identifies the first data block as a candidate for garbage collection on the memory component 112A. FIG. 3B illustrates a line 320 where the slope is less than the high threshold, but greater than the low threshold and thus, still meaningful. The data block represented by line 320 has not yet reached saturation, but still may be a candidate for garbage collection. In one embodiment, garbage collection component 113 adds an indication of the first data block to a garbage collection candidate list in local memory 119. The garbage collection candidate list may be a ranked list where the data blocks are stored based on an associated priority level. In one embodiment, the priority level is based on the actual rate of change of the amount of valid data on each data block, with the blocks having the lowest rate of change being given the highest priority, and thus being selected first for garbage collection. Accordingly, a data block for which the rate of change is less than the high threshold, but greater than the low threshold, would have a lower priority than another data block for which the rate of change is less than the low threshold.

Figure 3C:
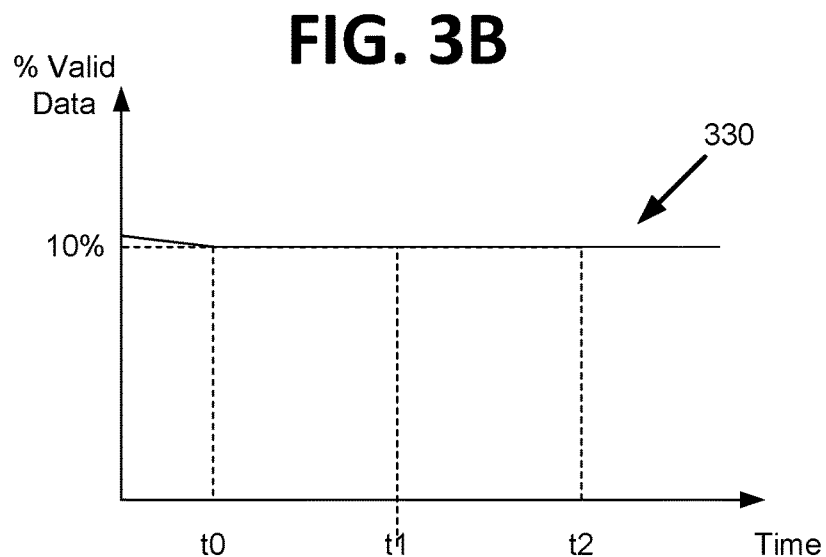

If the rate of change is below the low threshold, at operation 280, the processing device identifies the first data block as a candidate for garbage collection on the memory component 112A. FIG. 3C illustrates a line 330 where the slope is less than low threshold. The data block represented by line 320 has reached saturation, and is thus an excellent candidate for garbage collection. In one embodiment, garbage collection component 113 adds an indication of the first data block to a garbage collection candidate list in local memory 119. Since the data block has a rate of change that is less than the high threshold, it would have a higher priority than another data block for which the rate of change is higher. In other embodiments, there may be any number of intermediate thresholds between the high and low thresholds, all of which can be configured or otherwise adjusted to suit any particular implementation. As indicated in FIG. 3C, the amount of valid data on the first data block (e.g., approximately 10%) may be higher than the amount of valid data on other data blocks which are not currently selected as candidates for garbage collection. Those other data blocks may have decreasing amounts of valid data such that they may have even less valid data in the future, leading to lower utilization of resources for the garbage collection process.

Figure 4:
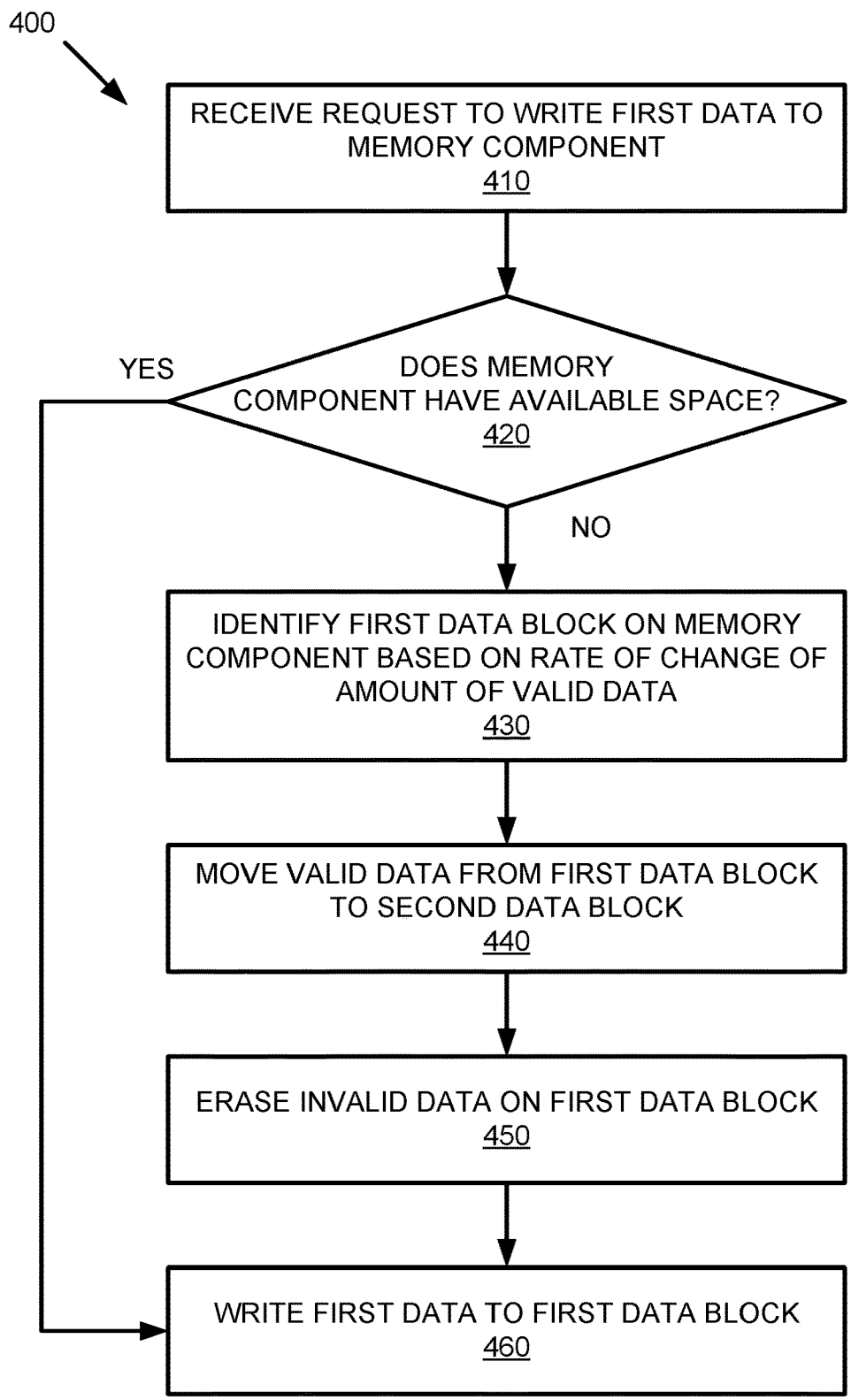
FIG. 4 is a flow diagram of an example method to reclaim space in a memory component in response to a write request in accordance with some embodiments of the present disclosure.

FIG. 4 is a flow diagram of an example method to reclaim space in a memory component in response to a write request in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the garbage collection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device receives a request to write first data to a memory component 112A. In one embodiment, controller 115 receives the request from host system 120 or from some other component connected to memory sub-system 110. The write request may include the first data to be written and an indication of the memory component 112A to which the first data is to be written.

At operation 420, the processing device determines whether the memory component 112A has an amount of available storage space to accept the first data. In one embodiment, controller 115 maintains records of the amount of available space (i.e., the capacity) on each of memory components 112A to 112N. These records can be stored in local memory 119. In response to receiving the write request, controller 115 may determine a size of the write request (i.e., a size of the first data to be written to memory component 112A) and compare that size to an amount of available storage space on the memory component 112A. If the size of the first data is larger than the amount of available storage space, then controller 115 determines that memory component 112A does not have an amount of available storage space to accept the first data. If the memory component does have available space, at operation 460, the processing device writes the first data to a first data block on the memory component 112A.

If the memory component does not have the amount of available storage space, at operation 430, the processing device identifies a first data block of a plurality of data blocks on the memory component 112A to erase based on a rate of change of an amount of valid data on the first data block. In one embodiment, the rate of change of the amount of valid data of the identified data block is below a threshold. As described above with respect to FIG. 2, in one embodiment, garbage collection component 113 determines whether a first data block of a plurality of data blocks on one of memory components 112A to 112N is among a first threshold number of the plurality of data blocks having a lower amount of valid data than a remainder of the plurality of data blocks. Responsive to the first data block being among the first threshold number, garbage collection component 113 determines whether the first data block is among a second threshold number of the plurality of data blocks having been written to more recently than the remainder of the plurality of data blocks. Responsive to the first data block being among the second threshold number, garbage collection component 113 determines whether a rate of change of an amount of valid data on the first data block is below a third threshold. Responsive to the rate of change being below the third threshold, garbage collection component 113 identifies the first data block as a candidate for garbage collection on the memory component.

At operation 440, the processing device moves the valid data on the first data block from the first data block to a second data block on the memory component 112A or on another memory component 112N of the memory sub-system 110 and at operation 450, the processing device erases the invalid data on the first data block. In one embodiment, garbage collection component 113 reads data stored on the first data block and writes that data to another data block. Once the data has been written to the other data block, the remaining invalid data stored in the first data block is erased and the initial data block is available to be programmed with new data. Depending on the embodiment, the data is relocated to another data block of the same memory component 112A or to a different memory component of the memory sub-system 110. At operation 460, the processing device writes the first data to the newly erased first data block.

Figure 5:
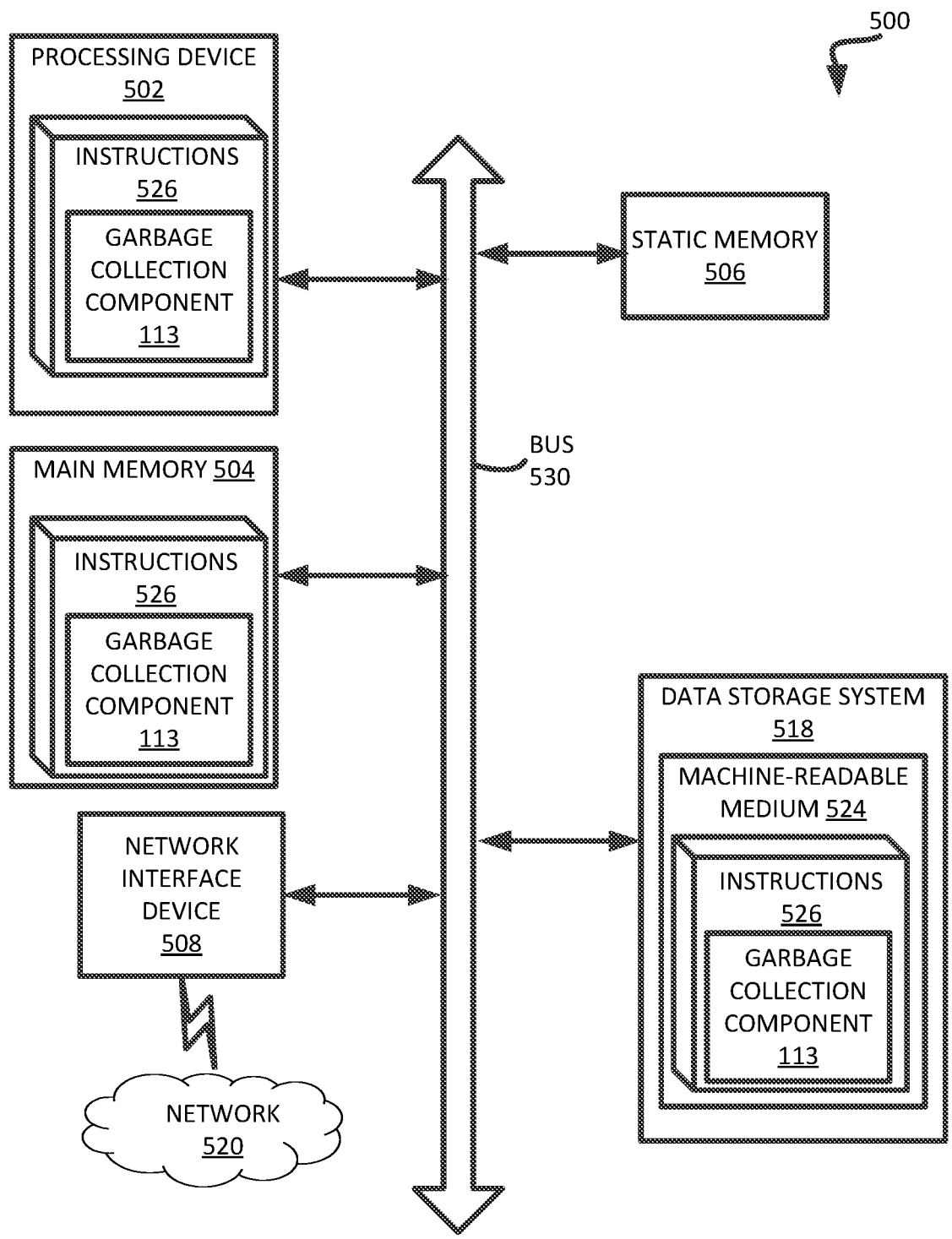
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the garbage collection component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to the garbage collection component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component; and
a processing device, operatively coupled with the memory component, to:
determine whether a first data block of a plurality of data blocks on the memory component satisfies a first threshold criterion pertaining to a first number of the plurality of data blocks having a lower amount of valid data than a remainder of the plurality of data blocks;
responsive to the first data block satisfying the first threshold criterion, determine whether the first data block satisfies a second threshold criterion pertaining to a second number of the plurality of data blocks having been written to more recently than the remainder of the plurality of data blocks;
responsive to the first data block satisfying the second threshold criterion, determine whether a rate of change of an amount of valid data on the first data block satisfies a third threshold criterion; and
responsive to the rate of change satisfying the third threshold criterion, identify the first data block as a candidate for garbage collection on the memory component.

2. The system of claim 1, wherein the processing device further to:
responsive to the first data block not satisfying the first threshold criterion, prevent the first data block from being identified as a candidate for garbage selection on the memory component.

3. The system of claim 1, wherein the processing device further to:
responsive to the first data block not satisfying the second threshold criterion, identify the first data block as a candidate for garbage collection on the memory component.

4. The system of claim 1, wherein the processing device further to:
responsive to the rate of change not satisfying the third threshold criterion, prevent the first data block from being identified as a candidate for garbage selection on the memory component.

5. The system of claim 1, wherein the rate of change of the amount of valid data on the first data block represents a level by which the amount of valid data on the first data block has decreased over a period of time.

6. The system of claim 1, wherein the third threshold criterion is configurable based on an amount available storage space on the memory component.

7. The system of claim 1, wherein the processing device further to:
determine that the rate of change of the amount of valid data on the first data block does not satisfy the third threshold criterion and satisfies a fourth threshold criterion; and
identify the first data block as a candidate for garbage collection on the memory component having a lower priority than a second data block, wherein a rate of change of an amount of valid data on the second data block satisfies the third threshold criterion.

8. A method comprising:
receiving a request to write first data to a memory component;
determining that the memory component does not have an amount available storage space to accept the first data;
identifying a first data block of a plurality of data blocks on the memory component to erase based on a rate of change of an amount of valid data on the first data block, wherein the rate of change of the amount of valid data satisfies a first threshold criterion;
moving the valid data on the first data block from the first data block to a second data block on the memory component;
erasing invalid data on the first data block; and
writing the first data to the first data block.

9. The method of claim 8, further comprising:
identifying an amount of valid data on each of the plurality of data blocks; and
sorting the plurality of data blocks based on the amount of valid data on each of the plurality of data blocks.

10. The method of claim 9, further comprising:
identifying a first subset of the plurality of data blocks, wherein the amount of valid data on each of the first subset of the plurality of data blocks is less than the amount of valid data on each of the plurality of data blocks not in the first subset.

11. The method of claim 10, further comprising:
identifying a second subset of the plurality of data blocks, wherein a write operation was performed on each of the second subset of the plurality of data blocks more recently than on each of the plurality of data blocks not in the second subset.

12. The method of claim 11, wherein the first data block is in both the first subset and the second subset.

13. The method of claim 8, wherein the rate of change of the amount of valid data on the first data block represents a level by which the amount of valid data on the first data block has decreased over a period of time.

14. The method of claim 8, wherein the first threshold criterion is configurable based on the amount available storage space on the memory component.

15. A non-transitory computer-readable storage medium comprising instructions that, when executed by a processing device, cause the processing device to:
determine whether a first data block of a plurality of data blocks on a memory component satisfies a first threshold criterion pertaining to a first number of the plurality of data blocks having a lower amount of valid data than a remainder of the plurality of data blocks;
responsive to the first data block satisfying the first threshold criterion, determine whether the first data block satisfies a second threshold criterion pertaining to a second number of the plurality of data blocks having been written to more recently than the remainder of the plurality of data blocks;
responsive to the first data block satisfying the second threshold criterion, determine whether a rate of change of an amount of valid data on the first data block satisfies a third threshold criterion; and
responsive to the rate of change satisfying the third threshold criterion, identify the first data block as a candidate for garbage collection on the memory component.

16. The non-transitory computer-readable storage medium of claim 15, wherein the processing device further to:
responsive to the first data block not satisfying the first threshold criterion, prevent the first data block from being identified as a candidate for garbage selection on the memory component.

17. The non-transitory computer-readable storage medium of claim 15, wherein the processing device further to:
responsive to the first data block not satisfying the second threshold criterion, identify the first data block as a candidate for garbage collection on the memory component.

18. The non-transitory computer-readable storage medium of claim 15, wherein the processing device further to:
responsive to the rate of change not satisfying the third threshold criterion, prevent the first data block from being identified as a candidate for garbage selection on the memory component.

19. The non-transitory computer-readable storage medium of claim 15, wherein the rate of change of the amount of valid data on the first data block represents a level by which the amount of valid data on the first data block has decreased over a period of time.

20. The non-transitory computer-readable storage medium of claim 15, wherein the third threshold criterion is configurable based on an amount available storage space on the memory component.

* * * * *